United States Patent [19]
Steensma

[11] 4,062,618
[45] Dec. 13, 1977

[54] SECURE OPTICAL MULTIPLEX COMMUNICATION SYSTEM

[75] Inventor: Peter Dennis Steensma, Midland Park, N.J.

[73] Assignee: International Telephone and Telegraph Corporation, Nutley, N.J.

[21] Appl. No.: 691,183

[22] Filed: May 28, 1976

[51] Int. Cl.² ............... G02B 27/00; H04B 9/00; G02B 5/14
[52] U.S. Cl. ............................. 350/3.5; 250/199; 350/96 WG
[58] Field of Search ........... 350/3.5, 96 B, 96 WG, 350/96 GN; 250/199; 178/DIG. 2

[56] References Cited

U.S. PATENT DOCUMENTS

| | | | |
|---|---|---|---|
| 3,612,641 | 10/1971 | Eaglesfield | 350/3.5 |
| 3,633,034 | 1/1972 | Uchida et al. | 250/199 |
| 3,633,035 | 1/1972 | Uchida et al. | 250/199 |
| 3,755,676 | 8/1973 | Kinsel | 250/199 |
| 3,785,718 | 1/1974 | Gloge | 350/96 GN X |
| 3,820,070 | 6/1974 | Fox | 250/199 X |

Primary Examiner—John K. Corbin
Assistant Examiner—John D. Lee
Attorney, Agent, or Firm—John T. O'Halloran; Alfred C. Hill

[57] ABSTRACT

The communication system includes a holographic system to provide a plurality of spatially multiplexed optical beams each modulated by a different one of a plurality of binary intelligence signals. The plurality of modulated spatially multiplexed optical beams are coherently transmitted on an optical waveguide to a hologram and an array of photosensors to recover each of the intelligence signals. The waveguide may be an optical fiber of the parabolic index type to coherently transmit all of the plurality of modulated spatially multiplexed optical beams, or a plurality of single mode step index optical fibers each coherently transmitting a different one of the plurality of modulated spatially multiplexed optical beams.

10 Claims, 4 Drawing Figures

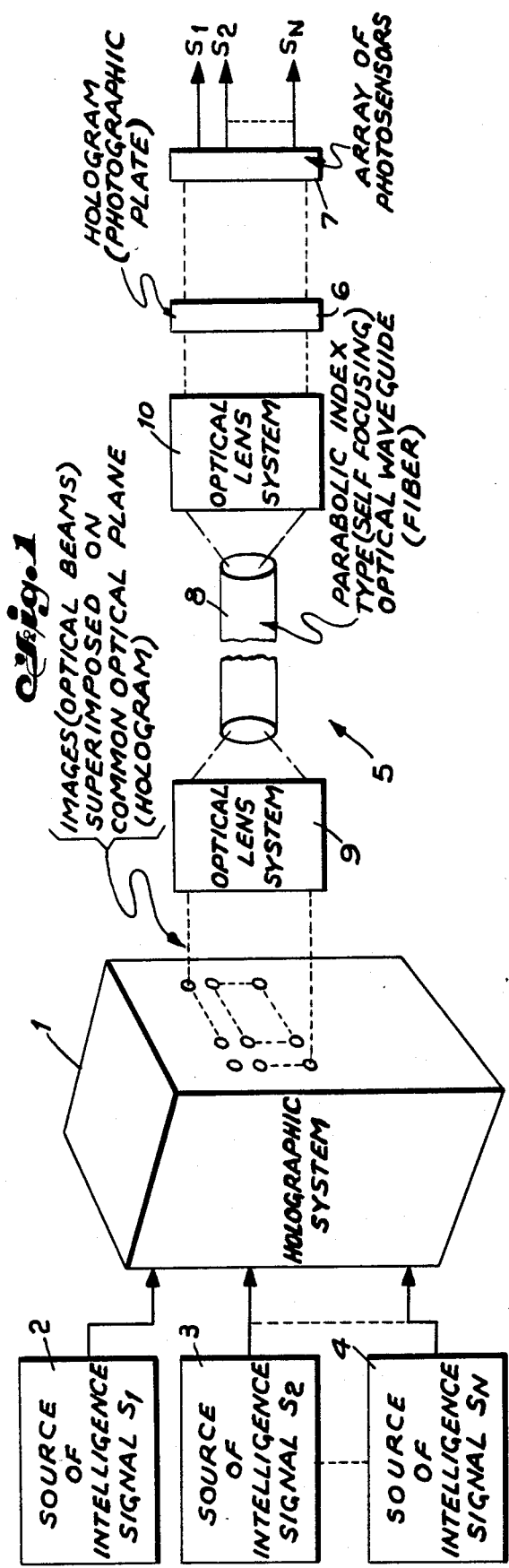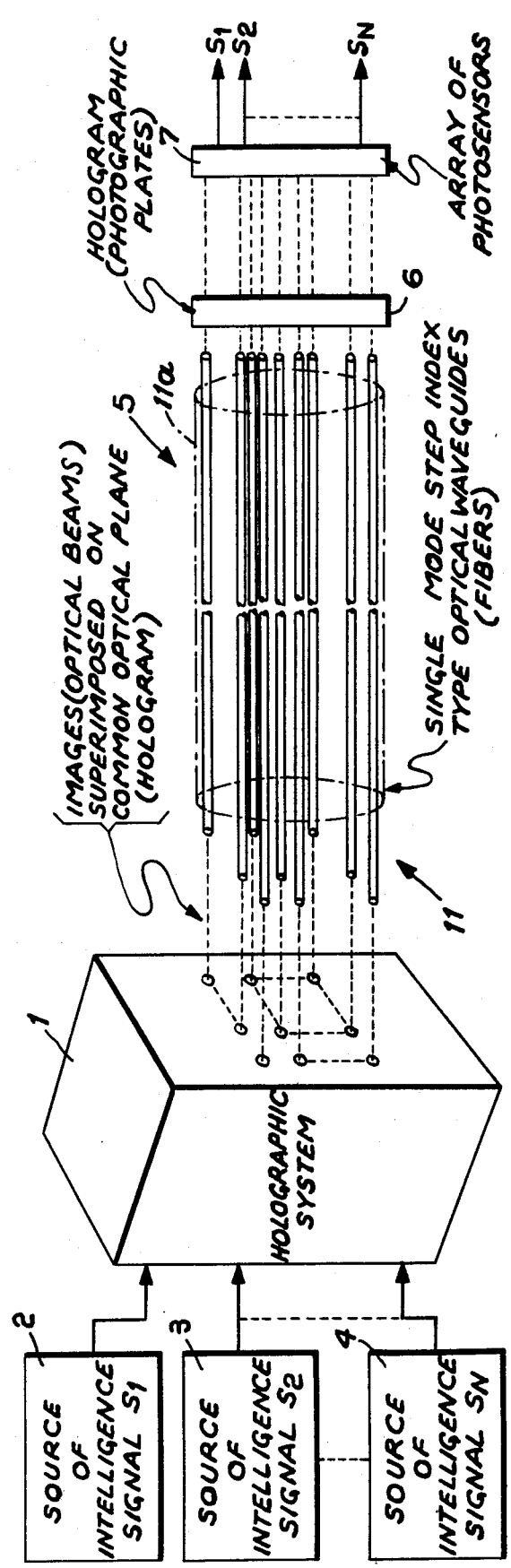

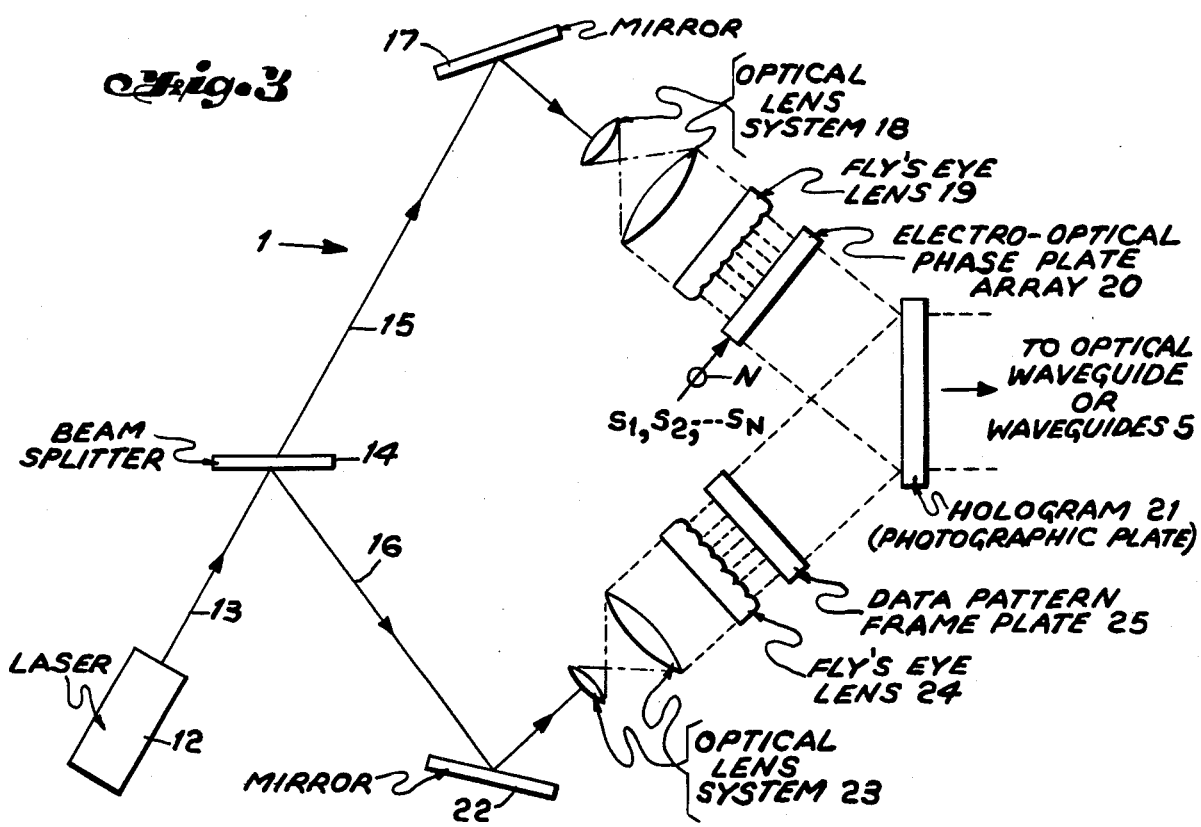
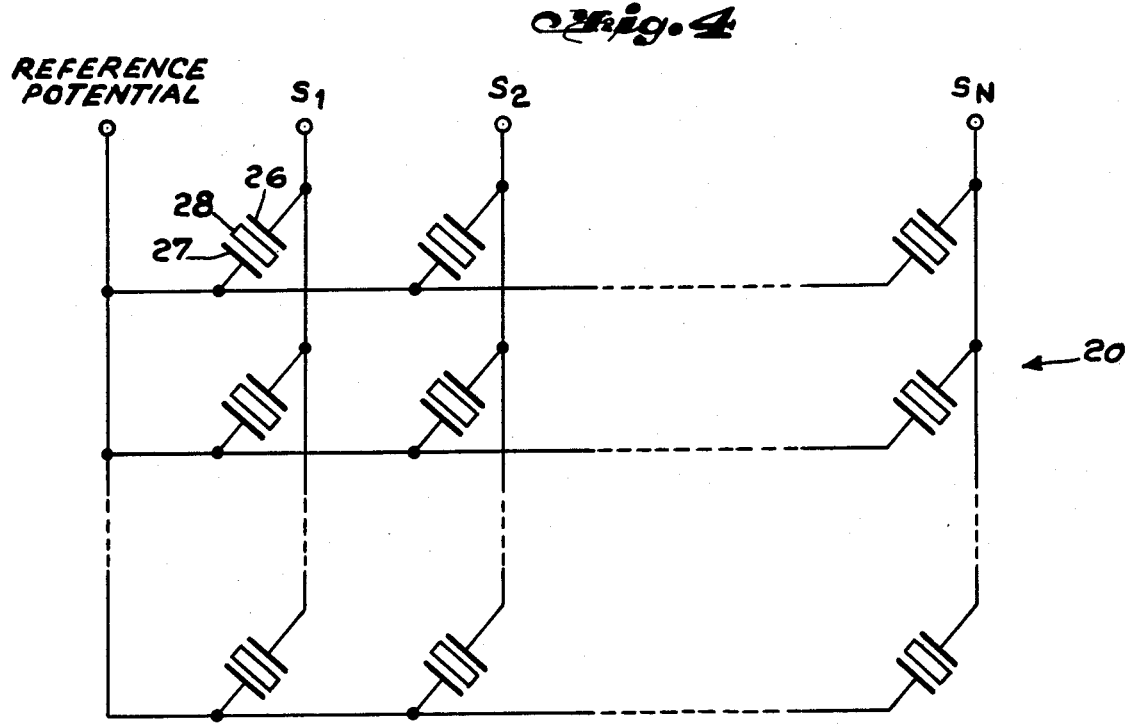

SECURE OPTICAL MULTIPLEX COMMUNICATION SYSTEM

BACKGROUND OF THE INVENTION

This invention relates to multiplex communication systems and more particularly to optical multiplex communication systems.

Most approaches to optical multiplex communication systems to date have been based upon a one beam of light at a particular frequency per optical fiber basis. To accomplish multiplexing to date, a plurality of beams of light have been provided which are separated in accordance with frequency division techniques. Since the carrier for intelligence in prior optical multiplex communication systems has been based on temporal modulation of the light beam carriers, frequency division of the light beam carriers or their modulating signals, the intelligence of communications to unwanted interception by an intruder is easily accomplished since all that is necessary is that the intruder monitor the intensity of the light beam in the optical waveguide or fiber.

SUMMARY OF THE INVENTION

An object of the present invention is to provide an optical multiplex communication system in which the multiplexing is accomplished by physically spaced light beam carriers, each modulated with a different intelligence signal, that is, a spatially multiplexed optical communication system is provided.

Spatial multiplexing is possible at optical frequencies since the small wavelengths allow convenient spatial modulation, and techniques for demodulation of spatial patterns by holographic matched filtering are available.

Another object of the present invention is to provide a spatially multiplexed optical communication system which is secure against unwanted interception by intruders.

A feature of the present invention is the provision of a secure optical multiplex communication system comprising: a plurality of sources of intelligence signals to be multiplexed and transmitted; first means coupled to the plurality of sources to provide a plurality of spatially multiplexed optical beams each modulated by a different one of the signals of the plurality of sources; an optical waveguide having one end thereof optically coupled to the first means for coherent transmission of the plurality of modulated spatially multiplexed optical beams to the other end of the waveguide; and second means optically coupled to the other end of the waveguide to recover from the plurality of modulated spatially multiplexed optical beams each of the signals of the plurality of sources.

BRIEF DESCRIPTION OF THE DRAWING

Above-mentioned and other features and objects of this invention will become more apparent by reference to the following description taken in conjunction with the accompanying drawing, in which:

FIG. 1 is a block diagram of one embodiment of a secure optical spatially multiplexed communication system in accordance with the principles of the present invention;

FIG. 2 is a block diagram of a second embodiment of a secure optical spatially multiplexed communication system in accordance with the principles of the present invention;

FIG. 3 is a block diagram of the holographic system of FIGS. 1 and 2; and

FIG. 4 is a schematic diagram of the electro-optical phase plate array of FIG. 3.

DESCRIPTION OF THE PREFERRED EMBODIMENTS

The embodiments of FIGS. 1 and 2 are substantially identical with the exception that each of the systems of FIGS. 1 and 2 include a different type of optical waveguide connecting the transmitting end and the receiving end of the secure optical spatially multiplexed communication system of the present invention. Basically the systems of FIGS. 1 and 2 include a holographic system 1 coupled to a plurality of sources 2, 3 and 4 of intelligence signals $S_1$, $S_2$ ... $S_N$, respectively. The holographic system provides a plurality of spatially modulated and superimposed optical beams, each of which is temporally modulated by a different one of the signals $S_1$, $S_2$ ... $S_N$. Although only three sources are shown, it is to be noted that up to N sources may be provided to control the holographic system 1 so as to intensity modulate N optical beams present at the output of system 1 which superimposed on a common optical plane, such as a hologram or photographic plate. The resultant plurality of modulated spatially multiplexed optical beams are then launched into an optical waveguide generally indicated as optical waveguide 5. The plurality of modulated spatially multiplexed optical beams at the output of optical waveguide 5 is optically coupled to a hologram 6, such as a photographic plate. The spatially multiplexed modulated optical beams which are demultiplexed by the hologram 6 and reconstructed as individual signals at the locations of individual photosensors in the photosensor array 7 such as light responsive diodes that produce an electric output signal or voltage proportional to the intensity of the light beam impinging thereon, to recover the modulating intelligence signals $S_1$, $S_2$ ... $S_N$.

In accordance with the illustration of FIG. 1, the optical waveguide 5 includes a parabolic index type (self-focusing) optical fiber 8 which is optically coupled to the hologram of holographic system 1 through an optical lens system 9. The plurality of coherently modulated spatially multiplexed optical beams at the output end of optical fiber 8 is optically coupled by means of optical lens system 10 to hologram 6.

In accordance with the illustration of FIG. 2, the optical waveguide 5 includes a plurality of single mode step index type optical fibers 11, each transmitting a different one of the plurality of modulated spatially multiplexed optical beams at the output hologram of the holographic system 1. The plurality of optical fibers 11 may be contained in a single cladding material 11a.

To permit proper demodulation, the optical fiber 8 of FIG. 1 and the optical fibers 11 of FIG. 2 must coherently transmit the optical beams therethrough to the receiving end of the system. Either type of optical fiber or fibers as illustrated in FIGS. 1 and 2 must be of sufficient quality to minimize spurious scattering and modes.

Referring to FIG. 3, there is illustrated therein a holographic system 1 which is fully disclosed in U.S. Pat. No. 3,612,641, whose disclosure is incorporated herein by reference.

The holographic system 1 of FIGS. 1 and 2 as illustrated in FIG. 3 includes a source, such as a laser 12, of a light beam 13. The light beam 13 produced by laser 12 is optically coupled to a beam splitter 14 to provide a first light beam 15 and a second light beam 16. A first mirror 17 is optically coupled to beam splitter 14 to reflect the first light beam 15 into a first optical lens system 18. The lens system 18 broadens the beam of light which then falls on fly's eye lens 19. Lens 19 concentrates the light of beam 15 into the apertures of the electro-optical phase plate array 20 to which is coupled the intelligence signals $S_1, S_2 \ldots S_N$ to electrically control the phase of the light passing through the apertures of array 20 with the apertures being arranged in a matrix such that certain of the apertures are electrically controlled by the intelligence signal $S_1$, others of the apertures are electrically controlled by intelligence signal $S_2$ and others of the apertures are electrically controlled by intelligence signal $S_N$, such that due to the interrelationship of the phase of the light beams passing through the apertures there is produced through cancellation by destruction interference one light beam associated with each of a different one of the intelligence signals $S_1, S_2 \ldots S_N$. The thusly produced light or optical beams convey the intelligence associated therewith to a common optical plane, such as hologram 21, from which the spatially multiplexed modulated optical beams are launched into the optical waveguide 5 of FIGS. 1 and 2. Light beam 16 is reflected by mirror 22 to optical lens system 23 which broadens light beam 16 which then falls on fly's eye lens 24. Lens 24 concentrates the light of beam 16 into an array of spots on a data pattern frame plate 25. The spots of plate 25 are arranged to coincide with areas of opaqueness or transparency of the pattern frame by which the data stored in the frame on hologram 21 is represented. To enable the spatially multiplexed modulated light beams produced on hologram 21 by array 20 to be read out and hence launched into the optical waveguide 5, light beam 16 is obstructed.

Referring to FIG. 4, there is illustrated therein one form of the matrix of the apertures of phase plate array 20 of FIG. 3. Each of the apertures of phase plate array 20 include a pair of electrodes 26 and 27 on opposite sides of electro-optic element 28. The arrangement of the electro-optic elements 28 and their electrodes 26 and 27 enables the control of the light beams that passes therethrough by its associated one of the intelligence signals $S_1, S_2 \ldots S_N$ so that the light beams passing through the apertures associated with each of the intelligence signals has a phase interrelationship of such a character as to cause the cancellation by destructive interference of all of the light beams except one light beam that is modulated by its associated intelligence source resulting in a plurality of modulated spatially multiplexed optical beams for launching into the optical waveguide 5. While FIG. 4 shows the matrix where the columns of apertures are associated with different ones of the plurality of intelligence signals other matrix arrangement could be provided. For instance, the different intelligence signals could electrically control apertures of phase plate array 20 that comprise apertures in a diagonal across the matrix or a matrix of columns and diagonal apertures.

To enable operation of the phase plate array 20 as disclosed in the above cited U.S. patent, the intelligence signals $S_1, S_2 \ldots S_N$ are each binary signals in the form of presence and absence of a particular value of voltage so as to control the transmission characteristics of the electro-optic element 28 of each of the apertures of the aperture matrix of FIG. 4.

To properly recover the plurality of intelligence signals in the array of photosensors 7 of FIGS. 1 and 2, these photosensors, which may be in the form of diodes that produce an electrical signal proportional to the intensity of the light beam impinging thereon, should be arranged in a matrix arrangement identical to the matrix arrangement of the apertures of the phase plate array 20.

From the viewpoint of the immunity of communications to unwanted interception there is considerable advantage to the spatial multiplexing afforded by the system described hereinabove with respect to FIGS. 1-4 in that an intruder must not only monitor the intensity of the spatially multiplexed optical beams, but must also monitor their transverse distribution, either on a single fiber optical waveguide as shown in FIG. 1, or among a number of optical waveguides as shown in FIG. 2. This is a difficult task to accomplish and avoid detection. The intelligence carried by the spatially multiplexed beams has in effect been diffused across the optical waveguide.

As disclosed hereinabove, in order to spatially multiplex a series of optical beams or carriers, each with its own temporal intensity variation for carrying intelligence, a set of highly distinguishable spatial patterns are superimposed on a common optical plane, such as the output hologram 21 (FIG. 3) of the holographic system 1. A set of such patterns based on phase modulating the transmission characteristics of $2^n$ apertures arranged in a matrix (phase plate array 20) as disclosed in the above-cited U.S. patent is employed in the holographic system 1. The plurality of optical beams passed through phase plate array 20 (FIG. 3) is superimposed on hologram 21 by placing a plane wave reference beam at a unique position for each state of the phase plate array 20. If the hologram 21 is simultaneously illuminated at each of the input locations with an optical beam of sufficient coherence to cause reconstruction, the $2^n$ light beams will be collinearly superimposed in the output plane of hologram 21. Furthermore, if these optical beams are temporally modulated, this modulation is automatically transferred to the associated output optical beam. If the superimposed optical beams are now directed onto an identical hologram 6 (FIGS. 1 and 2) to the one that was used to generate them the associated beams are reconstructed at spatially separated points. The light intensity at these points has the same temporal variation as the original light modulation and may be appropriately detected by the array of photosensors 7 having a matrix configuration identical to the matrix configuration of phase plate array 20.

While I have described above the principles of my invention in connection with specific apparatus it is to be clearly understood that this description is made only by way of example and not as a limitation to the scope of my invention as set forth in the objects thereof and in the accompanying claims.

I claim:

1. A secure optical multiplex communication system comprising:
   a plurality of sources of intelligence signals to be multiplexed and transmitted;
   a holographic system having at its output a given hologram on a first photographic plate, said holographic system being coupled to said plurality of sources to provide a plurality of spatially multiplexed optical beams on said first photographic plate each modulated by a different one of said signals of said plurality of sources;

an optical waveguide having one end thereof optically coupled to said first photographic plate for coherent transmission of said plurality of modulated spatially multiplexed optical beams to the other end of said waveguide;

a second photographic plate having said given hologram thereon optically coupled to said other end of said waveguide to reconstruct each of said plurality of modulated spatially multiplexed optical beams; and an array of photosensors optically coupled to said second photographic plate to recover each of said signals of said plurality of sources from said reconstructed plurality of modulated spatially multiplexed optical beams.

2. A system according to claim 1, wherein each of said signals of said plurality of sources is a binary signal in the form of the presence and absence of a predetermined value of voltage.

3. A system according to claim 1, wherein said holographic system is electro-optically coupled to said plurality of sources.

4. A system according to claim 1, wherein said plurality of modulated spatially multiplexed optical beams are superimposed on said first photographic plate.

5. A system according to claim 1, wherein said waveguide is a plurality of single mode step index optical fibers, each of said plurality of optical fibers coherently transmitting a different one of said plurality of modulated spatially multiplexed optical beams.

6. A system according to claim 1, wherein said waveguide is an optical fiber of the parabolic index type coherently transmitting all of said plurality of modulated spatially multiplexed optical beams.

7. A system according to claim 1, wherein said holographic system includes
a source of light beam
a beam splitter optically coupled to said source of a light beam to provide a first light beam and a second light beam,
a first mirror optically coupled to said beam splitter to reflect said first light beam,
a first lens system optically coupled to said first mirror,
a first fly's eye lens optically coupled to said first lens system,
an electro-optical phase plate array optically coupled to said first fly's eye lens and to said plurality of sources to provide a plurality of electrically modulated phase interrelated optical beams,
a second mirror optically coupled to said beam splitter to reflect said second light beam,
a second lens system optically coupled to said second mirror,
a second fly's eye lens optically coupled to said second lens system,
a data pattern frame plate optically coupled to said second fly's eye lens to provide a pattern of optical beams defining a data frame, and
said first photographic plate is optically coupled to said electro-optical phase plate array and said data pattern frame plate to provide said plurality of modulated spatially multiplexed optical beams.

8. A system according to claim 7, wherein said waveguide is a plurality of single mode step index optical fibers, each of said plurality of optical fibers coherently transmitting a different one of said plurality of modulated spatially multiplexed optical beams.

9. A system according to claim 7, wherein said waveguide is an optical fiber of the parabolic index type coherently transmitting all of said plurality of modulated spatially multiplexed optical beams.

10. A system according to claim 7, wherein each of said signals of said plurality of sources is a binary signal in the form of the presence and absence of a predetermined value of voltage, said binary signals electrically controlling said electro-optical phase plate array to provide said plurality of electrically modulated phase interrelated optical beams.

* * * * *